July 22, 1958 W. M. ADELMAN ET AL 2,844,781
THYRATRON CIRCUIT
Filed Sept. 24, 1954
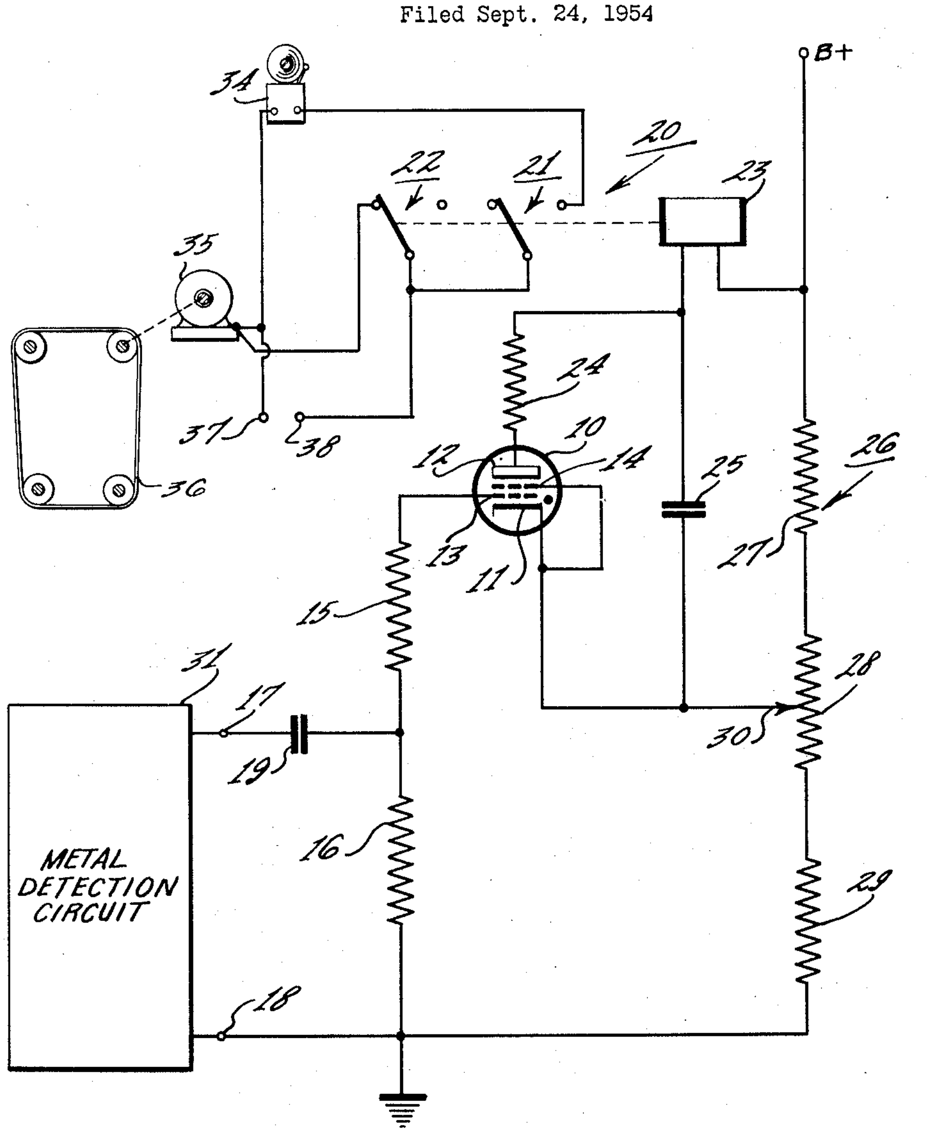
INVENTORS
William M. Adelman &
Helmuth F. Schneider
BY Morris Lebkin
ATTORNEY United States Patent Office 2,844,781

Patented July 22, 1958

2,844,781

THYRATRON CIRCUIT

William M. Adelman, Merchantville, and Helmuth F. Schneider, Westville, N. J., assignors to Radio Corporation of America, a corporation of Delaware Application September 24, 1954, Serial No. 458,244

2 Claims. (Cl. 318—445)

The present invention relates to a thyratron circuit, and more particularly, to a thyratron circuit for operating a relay and thereupon automatically resetting or recycling the relay.

It is desirable at times to operate a relay in response to an external condition. When such conditions occur in rapid succession, the relay must be reset or recycled after the operation thereof. The successful operation of a device, at times, depends upon the speed of such recycling or resetting.

High speed relay resetting is particularly desirable in the metal detector art. Two known metal detectors are the balanced bridge type and the "Q" type. The "Q" type metal detector detects the presence of a conductive or metallic particle passing through the tank coil of a stable oscillator. This particle will reduce the Q of the tank circuit by the induction therein of additional hysteresis or eddy current losses. This reduction in Q will be reflected as a change in the plate current of the oscillator and thus indicate the presence of the conductive particle.

In normal operation of a metal detector the articles to be inspected are placed upon a conveyor belt and passed through an inspection aperture. The presence of conductive or metallic particles causes the operation of a reject mechanism or circuit which may sound an alarm, stop the conveyor belt, or remove the article containing the metal from the conveyor belt. The reset devices which have been used in metal detector reject mechanisms or circuits ordinarily comprise mechanical timers or electronic circuits for operating relays. In one available metal detector equipment a relay is deenergized upon the detection of metal and held in a deenergized position by large capacitors connected in parallel across the relay. Mechanical timers or electronic circuits that are presently used have reset periods which are substantially longer than the reset period provided by the present invention. These mechanical timers have disadvantages in that they are relatively costly and have a limited usable life.

By means of the reset circuit of the present invention the inspection speed of the metal detector is greatly increased. In a metal detector apparatus for inspecting packages wherein a faulty package is automatically removed from a moving conveyor belt, the spacing between packages may be decreased. This allows more packages to be inspected in a given time.

Many electronic timing circuits using thyratrons are presently available. However, known timing circuits have not been adapted to operate as short-time relay recycling or resetting circuits. The use of a relay in the plate circuit of a thyratron has been avoided because of the necessity of deionizing the thyratron in order to recycle the relay. Several expedients have been adopted in order to circumvent this problem. In one case, an additional vacuum tube stage is interposed between the thyratron and the relay circuit. By means of the present invention, however, the relay is directly operated by the thyratron. Moreover, a readily available industrial type relay may be used in the reset circuit provided by the present invention.

Preferably the present invention comprises a thyratron tube which is adapted to be fired by a voltage pulse. This voltage pulse may be obtained from the metal detection circuits of a metal detector or the like. The operating winding of a relay is connected in series with the anode of the thyratron. Operating potentials are connected to the anode of the thyratron through this relay operating winding. A capacitor is connected between the anode and the cathode of the thyratron. The value of this capacitor determines the reset or recycling speed of the relay. The relay is maintained in a normally deenergized condition until the thyratron is fired.

It is an object of the present invention to provide a novel high speed relay resetting circuit.

It is a further object of the present invention to automatically and rapidly recycle or reset a relay.

It is a still further object of the present invention to provide a high speed reset circuit incorporating a thyratron that does not require expensive high impedance relays.

It is a still further object of the present invention to provide a thyratron circuit for operating a relay and automatically resetting it which has a variable reset time.

These and other objects and advantages of the present invention will, of course, become apparent and immediately suggest themselves to those skilled in the art to which the invention is directed from a reading of the following specification in connection with the accompanying drawing, the single figure of which is a schematic diagram showing an illustrative embodiment of the present invention.

Referring to the drawing, a thyratron 10 is shown having a cathode 11, an anode 12, a control grid 13 and a screen grid 14. By way of example, a type 2050 may be used. The screen grid 14 is connected directly to the cathode. A current limiting resistor 15 is connected to the control grid 13. A grid resistor 16 is connected in series with the current limiting resistor 15. A pair of input terminals 17 and 18 are connected to the metal detection circuit 31 of a metal detector which may be one of the above referred to metal detectors. Pulses for triggering the thyratron 10 are provided by the metal detector upon detection of metal or a conductive substance. Solely by way of example, the resistor 15 may have a value of 560,000 ohms and the resistor 16 may have a value of 1 megohm.

A capacitor 19 is connected to the junction between the grid resistor 16 and the grid current limiting resistor 15 and one of the input terminals 17.

A relay 20 having ganged contacts 21 and 22 and an operating winding 23 is provided. In the illustrative example, the relay operating winding 23 has a resistance of 20,000 ohms, and may be a midget type relay sold by the Arrow, Hart, and Hegeman Electric Company, Hartford, Conn. which is designated by the catalog number 28308–U. The relay operating winding 23 is connected in series with an anode current limiting resistor 24 to the anode 12 of the thyratron 10. A source of direct current operating potential (not shown) is connected to a terminal designated at B+. This terminal is connected to one end of the relay operating winding 23. Solely by way of example, the capacitor 19 has a value of 1 mfd. and the resistor 24 has a value of 15 ohms.

The ganged contacts 21 and 22 may be connected to any control circuit. They are shown herein as connected to sound a bell 34 and shut off power to a motor 35 which drives a conveyor belt 36. Two terminals 37 and 38 are available for connection to a source of operating power (not shown) for the bell 34 and the motor 35. The movable arms of the contacts 21 and 22 are connected to one of these terminals 38. The other terminal 37 is connected to the bell 34 and the motor 35. The circuit that connects the source of operating power to the motor 35 is completed through the normally closed contacts 22 of the relay 20. The bell 34 is connected to the fixed terminal of the contacts 21 that are nearest to the operating winding 23 of the relay 20. Therefore, the bell 34 circuit will be completed only upon operation of the relay.

A timing circuit which determines the interval for resetting the relay is provided. This timing circuit comprises a capacitor 25 connected between the cathode 11 of the thyratron 10 and the end of the relay operating winding 23 that is connected to the anode current limiting resistor 24. A voltage divider 26 consisting of three resistors 27, 28 and 29 connected in series is connected between the terminal available for connection to the source of operating potential, B+, and the input terminal which is connected only to the grounded side of the grid resistor 16. The centrally located resistor 28 of this voltage divider 26 is provided with a variable tap 30. The cathode 11 of the thyratron 10 is connected to this variable tap 30. The setting of the variable tap 30 on this central resistor 28 determines the bias on the control grid 13 of the thyratron 10, and hence the sensitivity of the thyratron circuit. Solely by way of example, the capacitor 25 has a value of 4.0 mfd. The resistors 27, 28 and 29 have values of 82,000 ohms, 1,000 ohms and 270 ohms, respectively.

In the operation of this circuit, a plus of voltage fires the thyratron 10 and causes conduction therethrough. The thyratron 10 is normally nonconducting because its cathode is connected to a point of positive potential on the central resistor 28 of the voltage divider 26. The magnitude of the voltage pulse required to fire the thyratron is determined by this value of this positive potential and the thyratron characteristics. Therefore, adjustment of the variable tap on the central tap on the central resistor 28 determines the sensitivity of this thyratron circuit. Upon the initiation of conduction in the thyratron 10 a large surge of current flows through the relay operating winding 23 and causes the relay 20 to operate. This reverses the position of the contacts 21 and 22 as shown in the drawing. The motor 35 that drives the conveyor belt 36 stops and the bell 34 sounds. It will be apparent that further sets of contacts may be provided that are operated by the relay 20.

Before firing of the thyratron the capacitor 25 will be charged to the value of the operating potential source B+. Upon conduction in the thyratron 10 the capacitor 25 discharges through the thyratron 10 and the anode current limiting resistor 24. As soon as conduction is initiated in the thyratron 10, the voltage across it drops sharply to a value that will sustain ionization. The capacitor 25 discharges to this ionization sustaining value of voltage. However, the capacitor 25 tends to discharge completely so that no voltage will appear across it. The completion of the discharge of the capacitor 25 results in additional current through the thyratron 10. According to the normal thyratron volt-ampere characteristic, this requires additional voltage across the thyratron 25. The circuit arrangement does not permit this additional voltage thereby precipitating the deionization of the thyratron 10. After a predetermined period determined by the value of the capacitor the thyratron 10 becomes deionized. Accordingly, the relay 20 is also deenergized and reset so that it is ready for the next triggering pulse.

What is claimed is:

1. A metal detector apparatus, comprising a metal detection circuit that provides an electrical output impulse in response to the presence of a conductive particle in a product to be inspected, equipment for handling said product, electrical mechanism for operating said product handling equipment, said electrical mechanism including a relay having an operating winding, a circuit for operating and automatically recycling said relay comprising a thyratron having an anode, a cathode, and a control electrode, a voltage divider, a source of direct current operating potential, one end of said voltage divider being connected to a point of reference potential, the other end of said voltage divider being connected to said source of operating potential, an anode current limiting resistor, said anode being connected in series with said anode resistor and said relay operating winding to said other end of said voltage divider, a capacitor for controlling of recycling time of said thyratron after ionization connected between said cathode and the junction of said operating winding and said anode current limiting resistor, said control electrode being resistively coupled to said point of reference potential, said cathode being connected to a point on said voltage divider intermediate the ends thereof for maintaining said cathode at a higher potential than said control electrode whereby said thyratron is normally deionized, and means for coupling the output impulses from said metal detection circuit to said control electrode for firing said thyratron.

2. The metal detector apparatus according to claim 1, wherein said equipment for handling said product is operated by an electric motor, said relay is provided with switching contacts, and said switching contacts are provided to stop and start current flow to said motor.

References Cited in the file of this patent

UNITED STATES PATENTS

| | | |
|---|---|---|
| 1,898,046 | Geffcken et al. | Feb. 21, 1933 |
| 2,096,427 | Gullikson | Oct. 19, 1937 |
| 2,148,578 | Pullis | Feb. 28, 1939 |
| 2,409,522 | Wall | Oct. 15, 1946 |
| 2,442,286 | Dodds et al. | May 25, 1948 |